United States Patent [19]
Norvell

[11] Patent Number: 5,472,760
[45] Date of Patent: Dec. 5, 1995

[54] VEHICLE INSULATION

[75] Inventor: Jean Norvell, Newark, Del.

[73] Assignee: W. L. Gore & Associates, Inc., Newark, Del.

[21] Appl. No.: 82,692

[22] Filed: Jun. 25, 1993

[51] Int. Cl.⁶ .............................. B60R 13/08; B61D 17/18
[52] U.S. Cl. ........................... 428/71; 244/119; 244/120; 296/39.3; 428/74; 428/76
[58] Field of Search .................... 428/71, 74, 76; 244/119, 120; 296/39.3

[56] References Cited

U.S. PATENT DOCUMENTS

| | | | |
|---|---|---|---|
| 3,953,566 | 4/1976 | Gore | 264/288 |
| 4,194,041 | 3/1980 | Gore et al. | 428/315 |
| 4,313,524 | 2/1982 | Rose | 181/291 |
| 5,102,711 | 4/1992 | Keller et al. | 428/71 |

FOREIGN PATENT DOCUMENTS

| | | |
|---|---|---|
| 3417874 | 5/1984 | Germany . |
| 2146289 | 4/1985 | United Kingdom . |
| WO8200266 | 2/1982 | WIPO . |

OTHER PUBLICATIONS

International Search Report for PCT/US94/07140.
Patent Abstracts of Japan vol. 10, No. 25 (M-450) 31 Jan. 1986 & JP, A, 60 183 241 (Sadao Nishibori) 18 Sep. 1985.

Abstract Glass Industry, Nov., 1991, p. 28.

Abstract Paper, Film & Foil Converter, p. 148, Nov. 1981.

Abstract Satellite Week, p. N/A, Oct. 22, 1990.

Abstract Blade (Toledo, Oh.), pp. 32, 35, Mar. 1, 1990.

Abstract Arizona Republic Phoenix, Az.), P.C;1, Aug. 24, 1988.

*Primary Examiner*—D. S. Nakarani
*Attorney, Agent, or Firm*—David J. Johns

[57] ABSTRACT

An improved insulation system for vehicles and method of making and using the same are disclosed. The insulation system comprises one or more layers of insulative material sealed within a case which is impermeable to liquids while being at least in part moisture vapor permeable. When installed within a sealed vehicle where moisture vapor build-up is a problem, the insulation of the present invention serves to isolate condensed moisture from causing damage to the vehicle's contents or its shell. When moisture levels decrease within the vehicle, moisture is free to evaporate from the insulation and dissipate from the vehicle, thus reducing the vehicle's weight and the costs inherent in excessive moisture retention within a vehicle.

20 Claims, 2 Drawing Sheets

VEHICLE INSULATION

BACKGROUND OF THE INVENTION

1. Field of the Invention

The present invention relates to insulation for vehicles, and especially to thermal and sound insulation installed within vehicles such as aircraft, trains, boats, automobiles and trucks.

2. Description of Related Art

The demand for faster and more comfortable vehicles has resulted in many problems for vehicles designers. One such problem is that thermal and acoustical insulation must be carefully selected to make sure that the vehicles remain comfortable and relatively quiet under a wide range of environmental demands. These demands are particularly stringent in the design of aircraft which regularly undergo dramatic temperature changes and which must screen intense operational noise.

Although not as extreme, other vehicles may also require considerable air-conditioning and acoustical insulation in order to comply with the demands of travelers or shippers. This is a growing concern in a variety of vehicles, such as high-speed trains, automobiles and trucks, and watercraft.

Another constraint placed upon vehicles today is that faster vehicles generally require better sealing of seams and portals so as to minimize noise, maintain pressure differentials, and improve laminar flow around the shell of the vehicle. Unfortunately, since tightly sealed vehicle shells do not freely exchange air with the outside of the vehicle, heavy demands are placed upon the ability of air-conditioning systems to vent moisture out of the vehicles.

Very tightly sealed vehicles, such as high-speed jet aircraft, can experience extensive moisture build-up in the passenger cabin from breath, perspiration, steam from foods, etc. When the exterior of such vehicles are at a lower temperature than the interior and/or undergo substantial changes in temperature, the moisture vapor in the interior air tends to condense against the shell or within insulation surrounding the shell.

The build-up of moisture within insulation surrounding a vehicle's shell is a multi-faceted problem. First, many insulation materials commonly used today, such as fiberglass and certain foams, have a tendency to retain water once wetted. As a result, the insulation increases in its weight over time as condensate forms and remains within the insulation. In vehicles where increase in weight can result in substantial differences in fuel costs (e.g. aircraft), this build-up of moisture results in lo astronomical waste in fuel. With the steadily increasing costs of fuels, weight is further becoming a concern in virtually all forms of vehicles, including automobiles, trucks, trains, and watercraft.

Second, the build-up and retention of water also poses a number of safety and health hazards. For example, the accumulation of water: (a) contributes to a corrosive environment on the concealed interior of the vehicle's shell and, if left unchecked, can weaken important structural parts; (b) reduces the maneuverability of the vehicle through excessive weight gain; and (c) promotes an unsanitary environment where microorganisms can grow.

Third, the presence of moisture in certain insulations will tend to distort or decay the insulation over time. This occurs due to the increased weight of wet insulation in sidewalls which draws the insulation downward. Eventually gaps will develop which reduce both the thermal and acoustical insulative properties of the insulation. Water will also decay certain insulations which can further reduce their insulative properties.

Fourth, eventually insulation will become saturated with moisture which can result in the dripping of condensate into the cabin or a sizable accumulation of water along the bottom of the vehicle's shell.

Earlier insulations employed in aircraft and similar vehicles were simply loose fibers or batts packed between the shell of the vehicle and the interior walls. Among the deficiencies of this insulation system was that it tends to be hard to install and maintain, and the insulation tends to slide out of position.

More recently in the aircraft industry it has been recognized that the insulation should be regularly removed so that the interior of the fuselage can be inspected for corrosion and other problems. To accomplish this, a number of companies have begun wrapping insulation into insulation packages which can be easily removed and reinstalled. Unfortunately, by placing the insulation within a casing material, the insulation package decreases the flow of air through the insulation and increases the retention of water.

One proposed solution to this problem has been to wrap the insulation within a casing of MYLAR® polyester film or other impermeable membrane which will be resistant to liquid and moisture vapor penetration. However, in order to compensate for pressure changes, some breathing holes have been required in the polyester material. These pressure compensation holes have resulted in inevitable ingress of moisture vapor and water build-up. Moreover, the fact that the casing material is essentially liquid and vapor impermeable means that, once the insulation becomes damp, the insulation package remains wet for a very long period of time.

Accordingly, it is a primary purpose of the present invention to provide an insulation system for vehicles which limits moisture retention and the problems inherent with such retention.

It is another purpose of the present invention to provide a vehicle insulation system employing a wrapped insulation package which can be readily installed and maintained but which does not contribute to increased moisture retention.

It is a further purpose of the present invention to provide a vehicle insulation system which contains liquid water away from the vehicle's shell while permitting the evaporation of water from the insulation material.

These and other purposes of the present invention will become evident from review of the following specification.

SUMMARY OF THE INVENTION

The present invention provides an improved insulation for use in a variety of vehicles, including aircraft, land vehicles and watercraft. The insulation of the present invention is particularly designed to serve as thermal and/or acoustical insulation for vehicles in which there is a build-up of moisture from passengers or cargo.

The insulation of the present invention comprises one or more layers of insulation material wrapped within a case to form an insulative package. The case is treated to be moisture vapor permeable while being impermeable to liquids. When installed within a vehicle, moisture vapor freely enters and leaves the insulative package, but condensate which may form within the insulative package is contained therein and does not leak out to cause structural problems within the vehicle. Unlike previous attempts to create an insulative package which is completely impermeable, since the case is "breathable" to moisture vapor, condensate which may form within the insulative package is free to evaporate and dissipate when conditions permit.

The insulation of the present invention is conveniently packaged for ease in handing and servicing. Moreover, the insulative package of the present invention is an effective means to help protect vehicles from moisture damage, while reducing the operational weight of vehicles which must transport people, animals, or moist cargo.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an improved insulation for use in virtually any form of vehicle or similar closed or sealed environment. As the term "vehicle" is employed herein, it is intended to encompass any form of device used to transport people, animals, and/or cargo, such as aircraft (e.g. airplanes, helicopters, spacecraft), land crafts (e.g. trains, automobiles, trucks, tractor-trailers), watercraft (e.g. boats, ships, submarines, hovercraft), etc. The present invention is particularly directed to partially or completely sealed vehicles in which the build-up of moisture or condensate from perspiration, breath, food, moist cargo, etc. may be a problem.

Figure 1:
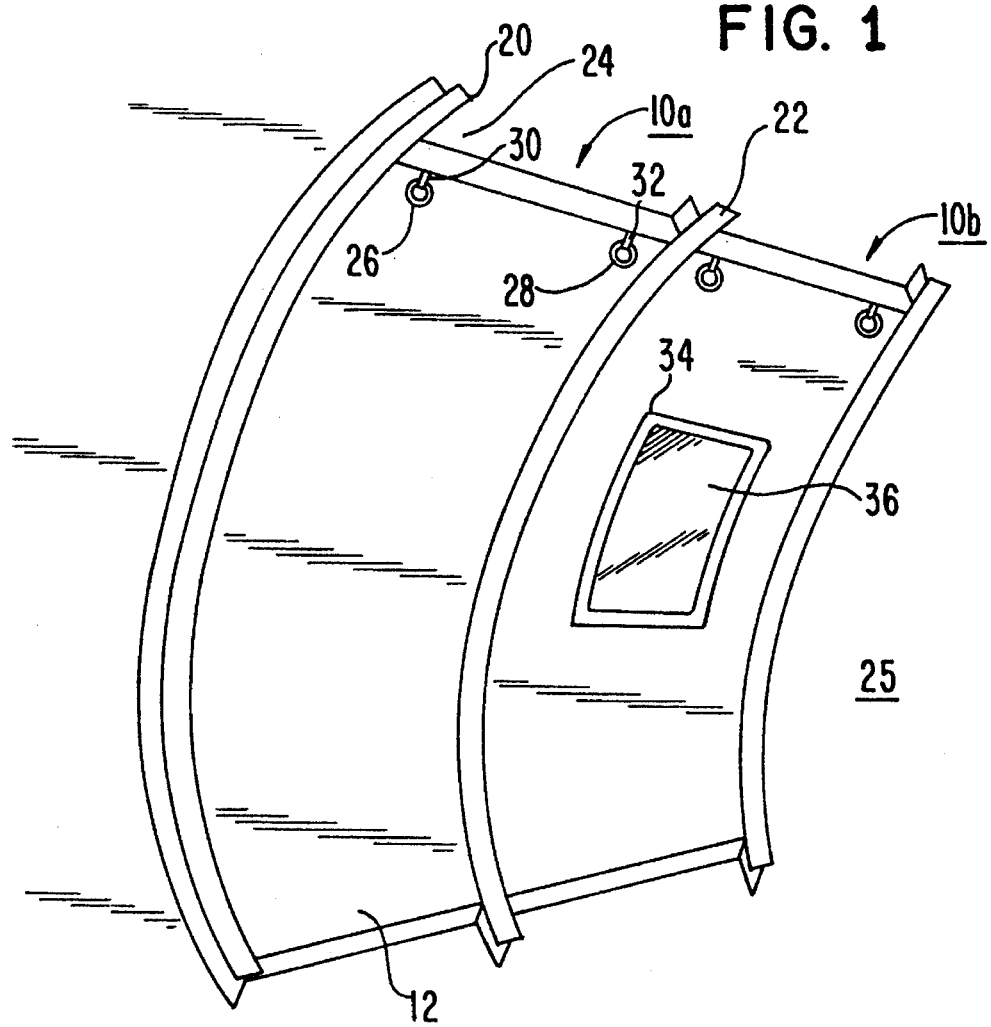
FIG. 1 is a three-quarter perspective view of an insulative package of the present invention shown mounted between ribs along an aircraft's fuselage (shell)
Figure 2:
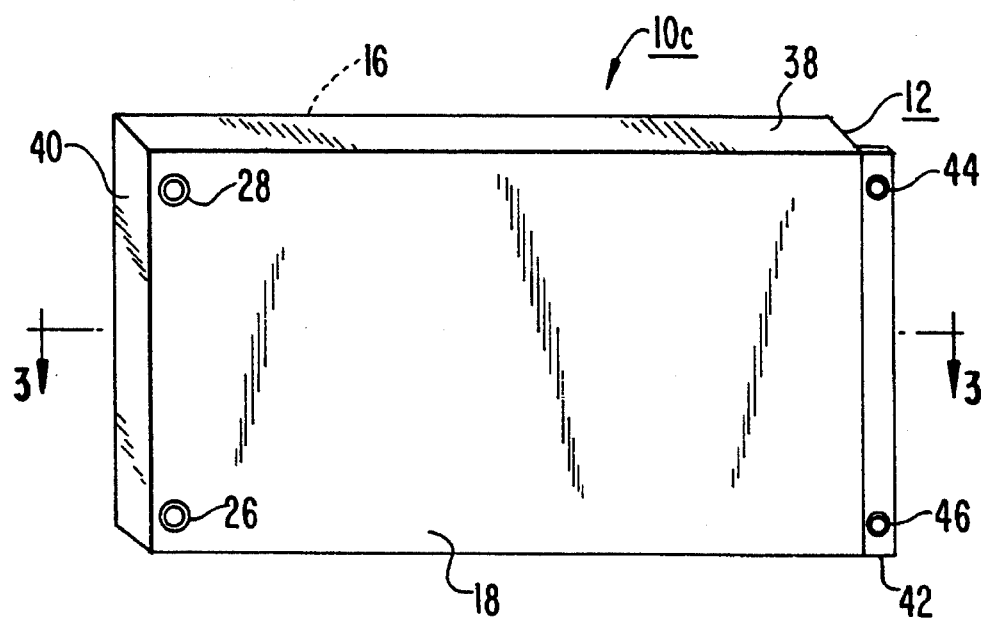
FIG. 2 is a three-quarter elevational view of one embodiment of an insulative package of the present invention.
Figure 3:
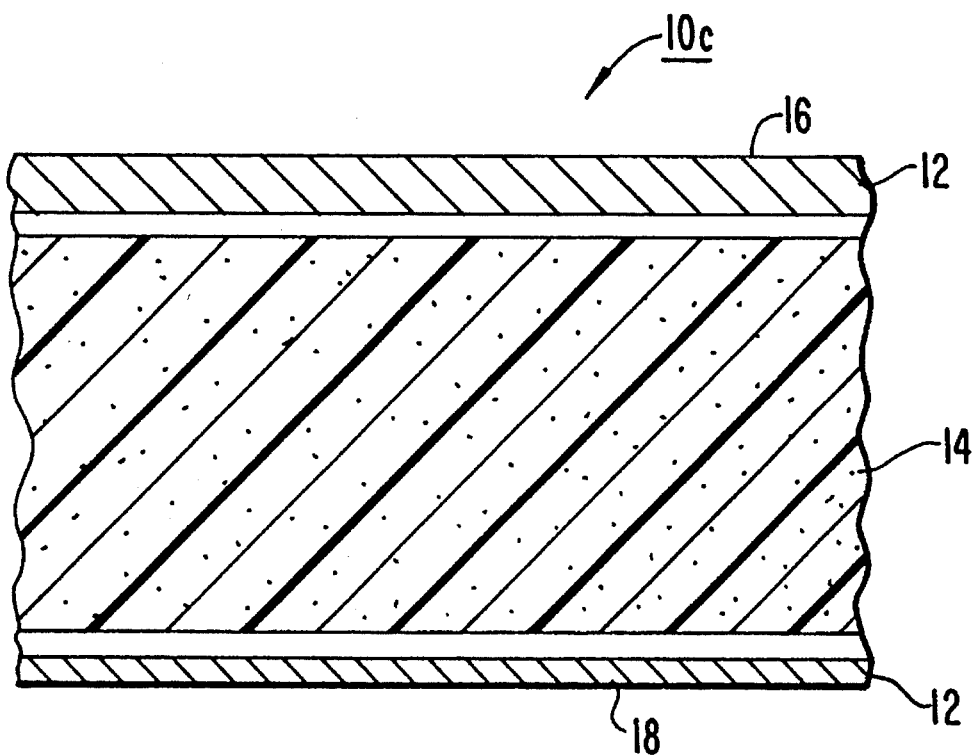
FIG. 3 is an enlarged cross-sectional view along line 3—3 of the insulative package shown in FIG. 2.

As is shown in FIGS. 1 through 3, the insulation panel package 10a, 10b, 10c of the present invention comprises a case 12 containing one or more layers of insulation material 14. The case 12 includes an interior surface 16 and an exterior surface 18.

Unlike some previous vehicle insulations which attempted to shield the insulation material from moisture vapor, at least a portion of the case 12 of the present invention is constructed from a material which permits the free ingress and egress of moisture vapor. However, in order to help protect the vehicle from direct contact with water or other liquids, the case is also formed to be liquid impermeable.

In order to accomplish this dual function of breathability and water resistance, it is desirable to construct most if not all of the interior surface 16 from a breathable, water resistant material, such as one of a variety of commercially available fabrics employing a laminate of breathable fluoropolymer (e.g. porous polytetrafluoroethylene (PTFE)), polyurethane, etc.

Preferably, the material comprises a laminate of expanded fluoropolymer, and especially expanded PTFE, which has been stretched to form a porous network of fibrils and nodes.

Such a product can be produced in a known manner, such as in accordance with the teachings of U.S. Pat. No. 3,953,566 issued Apr. 27, 1976, to Gore. This material is commercially available from W. L. Gore & Associates, Inc., Elkton, Md., under the trademark GORE-TEX® and with the specification of a single component microporous expanded PTFE membrane. Additionally, although it may detract slightly from its breathability, it may be further desirable to coat the expanded PTFE with a hydrophilic material such as polyurethane or similar substance, such as is disclosed in U. S. Pat. No. 4,194,041 issued Mar. 18, 1980, to Gore et al., to help protect the expanded PTFE from being compromised by oils or other contaminants. This latter material is also commercially available from W. L. Gore & Associates, Inc., under the trademark GORE-TEX® and with the specification of a bi-component microporous expanded PTFE membrane.

Materials produced in accordance with the teachings of these patents have the unusual properties of being moisture vapor permeable while being highly liquid repellent. As a result, moisture vapor in the air within the interior of the vehicle will readily pass into and out of the insulation package 10 of the present invention, but liquid which may condense within the insulation package 10 will remain safely contained within the package 10 until it evaporates. Accordingly, although the insulation may become damp in this process, the breathable casing 12 assures that this moisture can freely pass out of the package once the moisture returns to a vapor state.

As such, the insulation of the present invention provides a distinct improvement over previous vehicle insulation methods. Unlike the use of loose insulation alone, the insulation package of the present invention assures that condensed water is kept away from the shell of the vehicle and it is not prone to flowing down the side walls of the vehicle and accumulating in puddles at the base of the vehicle. Unlike the use of sealed insulation packages made from impermeable material, the insulation material employed with the present invention is given ample opportunity to dry-out and lose its condensate weight gain when conditions permit.

Shown in FIG. 1 is one application of the insulation panel package 10 of the present invention. The insulation package 10a is mounted between structural ribs 20, 22 commonly formed in a shell 24 of an aircraft or similar vehicle having an interior space 25. In normal operation, the insulation package 10a and ribs 20, 22 are regularly covered by internal paneling (not shown). The insulation package 10a may be merely packed in place or may be held in place through any of a variety of retention means, such as clips, hooks, snaps, hook-and-loop fasteners, etc. In the illustrated embodiment, reinforced apertures 26, 28 extending partially or fully through the insulation package 10 are provided to be attached to hooks 30, 32 affixed to the shell 24 of the vehicle. The aperatures 26, 28 should be sealed so as to prevent ingress of moisture through them into the insulation. Additional apertures and corresponding hooks or other retention means may also be provided at the bottom of the insulation package 10 and/or along its length to provide further support as needed.

Also illustrated in FIG. 1 is another embodiment of an insulation package 10b of the present invention. This embodiment includes an opening 34 therein to provide access to a window 36 or other fixture in the vehicle's shell 24. As is demonstrated by this embodiment, the insulation packages of the present invention may be constructed in virtually any shape and size to accommodate various operational demands—whether in units of customized shape (as shown) or in smaller generic units which can be packed around windows or other fixtures as necessary.

The construction of another embodiment of a insulation package 10c of the present invention is shown in FIGS. 2 and 3. In this embodiment the insulation package 10c includes an interior surface 16 constructed entirely from a fabric laminated to a breathable/waterproof expanded PTFE membrane. The fabric can be formed from any suitable material which will permit moisture vapor to pass through it, such as nylon, polyester, or other suitable substrates.

The insulation material 14 may be constructed from any conventional material used in vehicle insulation, such as fiberglass, open cell or closed cell foam of polyurethane, polyimide, polyamide, etc. Ideally, the insulation material 14 should not retain water when wetted so as to allow the free dissipation of moisture vapor. As is discussed below, the insulation layer may also comprise a hybrid of two or more different materials which may address particular operational demands.

One potential form of insulation may comprise a combination of PTFE resin and expandable thermoplastic microspheres. As is disclosed in Japanese Laid-Open Patent Application JP 4335044, of Junkosha Company, Ltd., published 24 Nov. 1992, as well as WIPO Patent Applications WO 93/00163 and WO 93/00390 of Minnesota Mining and Manufacturing Co., each published 7 Jan. 1993, an expanded PTFE can be formed by mixing unexpanded thermoplastic expandable microspheres into a resin of PTFE and then applying heat to expand the microspheres and the resin into an expanded mass of nodes and fibrils. This expanded mass has been demonstrated to be thermally insulative while being permeable to moisture vapor. It should be noted, however, that expandable microspheres presently commercially available under the trademark EXPANCEL® from Nobel Industries Sweden, Sundsvall, Sweden, have certain temperature limitations and other constraints which may restrict their range of possible uses as vehicle insulation. Nevertheless, it should be clear that the present invention will perform well with a variety of insulation materials, whether now known or later developed.

Insulation material 14 can be placed within the case 12 through a variety of methods. While the insulation may be merely inserted or stuffed within the case, for certain insulation (e.g. fiberglass) it may be preferred that the insulation be attached to the case in some manner (e.g. through adhesives, rivets, sewing, etc.) to prevent the insulation from shifting positions during use.

For some applications it is believed to be preferable to place a completely impenetrable barrier between the insulation layer 14 and the shell 24 of the vehicle. In tightly sealed vehicles such as jet aircraft, it is contemplated that little useful evaporation will occur through the exterior surface 18 of the insulation package. In light of this, it may be desirable to isolate the shell 24, ribs 20, 22, and/or other structural parts of the vehicle from both liquid water and water vapor. To accomplish this, the exterior surface 18 of the insulation package 10c of the embodiment of FIGS. 2 and 3 is formed from a completely impenetrable material such as MYLAR® polyester produced by E. I. dupont de Nemours and Company of Wilmington, Del., or any other impermeable products. Similarly, if side walls 38, 40 are provided, these (or other discrete portions of the insulation package 10c) may also be constructed from such material to address particular operational requirements.

An alternative mounting method is also shown in FIG. 2. In addition to (or in place of) apertures 26, 28, which pass into or through the insulative package 10c, a mounting strip 42 is provided on one end of the package with grommet openings 44, 46 provided therein. This alternative attachment means may be preferred for some applications due to its ease in construction. Naturally, different types of mounting means may be used or combined as is necessary.

Figure 4:
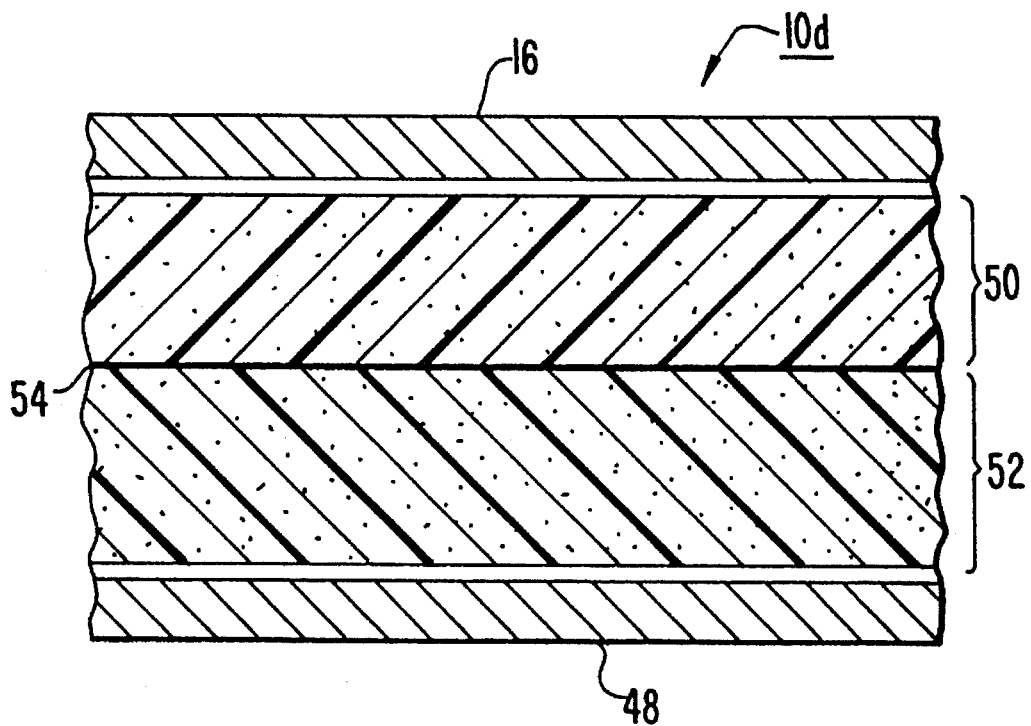
FIG. 4 is an enlarged cross-sectional view of another embodiment of the vehicle insulation package of the present invention.

FIG. 4 depicts another possible construction of an insulation package 10d of the present invention. In this embodiment, an exterior surface 48 is provided which is also constructed from a breathable/waterproof material. In applications where evaporation can occur through both the interior and exterior surfaces of the insulation package 10d (e.g. in dividing walls within a vehicle or along the shell in less tightly sealed vehicles), this form of construction can greatly increase the surface area across which evaporation may occur.

In order for the insulative package 10 of the present invention to be fully effective, it is important that all seams holding the case together be properly sealed to avoid the leakage of condensate through the seams. Seam sealing can be accomplished in any accepted manner, such as through application of waterproof seam sealing tape, use of seam sealing adhesive or other chemical sealing product, ultrasonic welding, fusing, heat sealing, etc.

As was previously mentioned, the present invention readily lends for use with multiple layers of insulation. In the embodiment shown in FIG. 4, two insulation layers are provided; a first layer 50 of an open cell foam (e.g. polyurethane, polyimide) and a second layer 52 of a fibrous material (e.g. fiberglass). Although the two layers may be placed in direct contact with each other, in this embodiment a barrier material 54 is provided between the two insulation layers 50, 52.

The barrier material 54 can play multiple roles in the present invention. For example, the barrier material may serve: to help isolate and protect the outer insulative layer of insulation from water vapor and/or liquid water; to prevent water vapor from passing through the insulative package 10d to the vehicle's shell; as an additional thermal and/or acoustical baffle for improved insulative properties; as an additional mechanism to help support the insulative material and retain it in place during operation; etc. Depending upon the properties sought, the barrier material 54 may comprise any suitable material, including a fully permeable fabric, a breathable/waterproof membrane, or a completely impermeable membrane.

It is believed that there may be instances where different combinations of materials may be useful for certain applications. For instance, for some uses, it may be desirable to form the exterior surface of the insulation package 10 from a breathable material and the interior surface from a moisture vapor impermeable material. As such, the insulation package 10c shown in FIGS. 2 and 3 may simply be mounted with its exterior suface 18 facing inwardly toward the interior of the vehicle. Additionally, one or more layers of permeable, semi-permeable, or impermeable barrier material 54 may also be included to impart other specific characterists to the insulation package.

For certain applications where the vehicle may have its own built-in mechanisms for draining condensate which may drip from insulation {as may be provided in some aircraft), it may be beneficial to provide drain holes in the insulation package 10 to allow excess condensate to drain from the insulation package in bulk and be removed by the vehicle's water drainage system. In these instances, it is believed that the insulation can be dried even more rapidly since only retained moisture in the insulation material needs to evaporate through the breathable case 12.

Additionally, the insulation package of the present invention may also be installed in interior dividing walls, floors, ceilings, and other structures where insulation without build-up of condensation is of a concern. While the terms "interior" and "exterior" have been used throughout this application, this is strictly for ease in identifying the general spatial orientation of the insulative packages of the present invention and is not intended to limit possible placement and use of the present invention.

It should be evident that the present invention has a wide range of possible applications. As has been explained, the insulation of the present invention can be used to insulate the exterior walls of many different types of vehicles. As such, the term "shell" as applied herein is intended to encompass any form of dividing structure used to define interior space of a vehicle, including without limitation: the fuselage of aircraft; bodies of automobiles and trucks; hulls or cabin walls of ships; roofs, doors, sidewalls, or floors of trailers or cargo containers; bodies of trains; etc.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. Vehicle insulation which comprises
   at least one insulation layer;
   a case surrounding the insulation layer to form an insulation package, wherein the case includes material which is liquid water repellent and moisture vapor permeable;
   wherein moisture vapor within the vehicle passes freely into and out of the insulation package, allowing condensate to evaporate away from the insulation.

2. The insulation of claim 1 wherein the case material includes a laminate of breathable polytetrafluoroethylene membrane.

3. The insulation of claim 2 wherein the polytetrafluoroethylene membrane comprises an expanded lattice of polytetrafluoroethylene nodes interconnected by fibrils.

4. The insulation of claim 1 wherein
   the case includes a first surface and a second surface, wherein each of said first and second surfaces facing away from the insulation layer; and
   the second surface of the insulation package comprises a fabric laminated with a breathable polytetrafluoroethylene membrane on one side to form the material which is water repellent and moisture vapor permeable.

5. The insulation of claim 4 wherein the first surface of the case comprises a material impermeable to moisture vapor transmission.

6. The insulation of claim 4 wherein both the first surface and the second surface of the case comprise a fabric laminated with a moisture vapor permeable polytetrafluoroethylene membrane.

7. The insulation of claim 1 wherein multiple layers of insulation material are provided within the insulation package.

8. The insulation of claim 1 wherein a layer of insulation material is provided which is readily moisture vapor permeable, permitting moisture vapor to pass into and out of the insulation.

9. The insulation of claim 8 wherein the layer of insulation material which is moisture vapor permeable includes a breathable polytetrafluoroethylene.

10. The insulation of claim 8 wherein the insulation comprises an expanded fluoropolymer with expanded microspheres enmeshed therein.

11. An insulated vehicle, the vehicle having an outer shell, an interior, and an insulation package mounted between the outer shell and the interior of the vehicle, the insulation package comprising:
    at least one layer of insulation material;
    a case wrapped around the insulation material to form the insulation package, the case comprising at least in part a material which is liquid water repellent but moisture vapor permeable; and
    wherein moisture vapor contained in air within the interior of the vehicle passes freely into and out of the insulation package but liquids are prevented from passing through the case.

12. The insulated vehicle of claim 11 wherein the case material includes a laminate of moisture vapor permeable polytetrafluoroethylene membrane.

13. The insulated vehicle of claim 12 wherein the polytetrafluoroethylene membrane comprises expanded polytetrafluoroethylene having a porous network of nodes and fibrils.

14. The insulated vehicle of claim 11 wherein
    the insulation package comprises a layer between the shell and the interior of the vehicle, the package including an exterior surface facing the shell of the vehicle and an interior surface facing the interior of the vehicle; and
    the interior surface of the insulation package comprises the fabric laminated with a moisture vapor permeable polytetrafluoroethylene membrane.

15. The insulated vehicle of claim 14 wherein the exterior surface of the insulation package comprises a material impermeable to moisture vapor.

16. The insulated vehicle of claim 14 wherein both the interior and exterior surfaces of the insulation package comprise a fabric laminated with a moisture vapor permeable polytetrafluoroethylene membrane.

17. The insulated vehicle of claim 11 wherein multiple layers of insulation material are provided within the insulation package.

18. The insulated vehicle of claim 11 wherein a layer of insulation material is provided which is moisture vapor permeable, permitting moisture vapor to pass into and out of the insulation.

19. The insulated vehicle of claim 18 wherein the layer of insulation material which is moisture vapor permeable includes a breathable polytetrafluoroethylene material.

20. The insulated vehicle of claim 19 wherein the insulation comprises an expanded fluoropolymer with expanded microspheres enmeshed therein.

* * * * *